United States Patent [19]

Courgeon

[11] Patent Number: 5,226,853
[45] Date of Patent: Jul. 13, 1993

[54] TELESCOPIC COUPLING FOR STEERING SYSTEMS

[75] Inventor: Jean-Claude Courgeon, Vendome, France

[73] Assignee: NACAM, Vendome, France

[21] Appl. No.: 795,844

[22] Filed: Nov. 21, 1991

[30] Foreign Application Priority Data

Nov. 23, 1990 [FR] France .................. 90 14656

[51] Int. Cl.$^5$ .................. F16D 3/06; F16D 3/10
[52] U.S. Cl. .................. 464/160; 74/493; 277/188 R; 280/275; 464/162; 464/172
[58] Field of Search .................. 464/162, 169, 172, 160; 74/493; 280/778, 775, 777; 277/99, 142, 188 R

[56] References Cited

U.S. PATENT DOCUMENTS

| | | | |
|---|---|---|---|
| 1,080,894 | 12/1913 | Cruzan .................. | 277/99 X |
| 2,598,780 | 6/1952 | Garnier . | |
| 2,796,749 | 6/1957 | Warner .................. | 464/172 X |
| 2,923,140 | 2/1960 | Weasler .................. | 464/172 X |
| 2,937,881 | 5/1960 | Norrie . | |
| 3,575,015 | 4/1971 | Geisthoff et al. .................. | 464/162 X |
| 3,830,508 | 8/1974 | Endicott .................. | 277/142 |
| 3,922,928 | 12/1975 | Kester .................. | 464/162 X |
| 4,384,861 | 5/1983 | Lange et al. .................. | 464/169 X |
| 4,551,115 | 11/1985 | Ferguson .................. | 464/160 X |
| 4,833,936 | 5/1989 | Mariani et al. .................. | 280/775 X |

FOREIGN PATENT DOCUMENTS

| | | |
|---|---|---|
| 2330642 | 1/1974 | Fed. Rep. of Germany . |
| 2400811 | 7/1975 | Fed. Rep. of Germany . |
| 2205149 | 11/1988 | United Kingdom .................. 74/493 |

OTHER PUBLICATIONS

French Search Report, Nov. 23, 1990.

Primary Examiner—Daniel P. Stodola
Assistant Examiner—William G. Battista, Jr.
Attorney, Agent, or Firm—Burns, Doane, Swecker & Mathis

[57] ABSTRACT

A telescopic coupling for use in applications such as the steering systems of heavy trucks. The coupling has modes and includes a female member, a male member, and an interposed member which are connected together in a main sliding system operable in a first operating mode in which the male and female members are axially slidable relative to one another and the coupling is rotatable substantially without circumferential play. The female member, the male member, and the interposed member are joined together in a second sliding system operable in a second operating mode in which the male and female members are axially slidable relative to one another and the coupling is rotatable with a limited amount of circumferential play. The secondary sliding system ensures the safety of the main sliding system in the event of wear of the latter by the appearance of circumferential play in the coupling.

18 Claims, 5 Drawing Sheets

TELESCOPIC COUPLING FOR STEERING SYSTEMS

FIELD OF THE INVENTION

The present invention relates to extensible couplings for rotationally connecting together two shafts, and particularly to couplings intended for use for automobile steering columns.

The object of the invention consists more particularly of an extensible coupling of this type which has two operating modes, namely a first, normal operating mode for which axial sliding is easy and great accuracy of transmission of a rotation is achieved and which permits axial deflection with oscillations which are random in respect of both frequency and amplitude, and a second, occasional operating mode for which axial sliding is immaterial and accuracy of transmission of a rotation is relatively poor, and which permits stable additional axial elongation.

DESCRIPTION OF THE PRIOR ART

As is known, particularly in connection with automobiles, some vehicles, more particularly those of the heavy truck type, are provided with a driver's cab which is tiltable relative to the chassis in order to facilitate servicing, particularly of the engine.

In most cases, the hinge axis of the cab does not coincide with the hinge axis of one of the universal joints of the hinged steering column. This therefore entails axial lengthening or shortening of the steering column and thus makes it necessary to use an extensible or telescopic coupling in the steering column.

This type of coupling is also used for the steering columns of vehicles equipped with systems for the adjustment, particularly the axial adjustment, of the position of the steering wheel, and also when the cab is mounted on the chassis with the aid of a suspension system. This implies the possibility of modifying the axial length of at least a part of the steering column. In the first case, when the vehicle is at rest the driver adapts the position of the steering wheel in the cab to the geometry of the latter and to his own morphology driving style, so as to ensure agreeable and comfortable driving; this adjustment is occasional. In the second case, while the vehicle is moving and the driver is in his driving station, the cab is displaced relative to the chassis and the steering wheel, after its position has optionally been adjusted as described above, follows the deflections of the cab relative to the chassis and is thus subjected to oscillations which are random in respect of both frequency and amplitude, and which modify the axial length of the steering column in accordance with the fluctuations of traffic conditions; these deflections are practically continuous while the vehicle is moving.

GENERAL DESCRIPTION OF THE INVENTION

The invention seeks to provide an extensible coupling having two operating modes for rotationally connecting together two shafts, and more particularly relates to the application thereof to automobile steering columns.

The coupling according to the invention, which permits deflections for the modification of its axial length, either for example for adjustment of the position of a steering wheel or to enable movements due to the suspension of the cab to be followed, when one of the tilting axes of the column is different from that of the cab, also makes it possible to achieve an additional axial elongation in order to achieve a maximum extended length which is very substantial in relation to its minimum length, while retaining the relative circumferential orientation of the component parts of the coupling and, more particularly, of the two shafts coupled by it.

The object of the invention is an extensible coupling which has two operating modes for rotationally connecting together two shafts slidable along an axis, and which, among other component parts, comprises a female member which has a hollow part provided with an inside wall having a non-circular cross-sectional profile and which is intended to be connected to one of said shafts; a male member which has a hollow part having on the one hand an external wall having a non-circular cross-sectional profile complementary to the non-circular cross-sectional profile of the inside wall of the female member, and on the other hand an inside wall having a non-circular cross-sectional geometry, and which is intended to be connected to the other shaft; and an interposed member having an end which has an external wall having a non-circular cross-sectional profile complementary to the non-circular cross-sectional profile of the inside wall of the female member, and another end which has an external wall having a non-circular cross-sectional geometry intended to cooperate with the non-circular cross-sectional geometry of the inside wall of the male member; and in which the male member is engaged in the female member in such a manner that the walls with their complementary profiles can readily slide axially without circumferential play in order to constitute a connection of a main sliding system operating in a first, normal operating mode; and in which the interposed member is engaged both in the female member and in the male member in such a manner that on the one hand their respective walls are in contact and the profile of the inside wall of the female member, together with the complementary profile of the external wall of the end of the interposed member, ensure axial sliding without circumferential play, and on the other hand the geometry of the inside wall of the male member, together with the geometry of the external wall of the other end of the interposed member, ensure axial sliding with circumferential play in order to constitute a joint of a secondary sliding system which operates in a second, occasional operating mode.

Another object of the invention is the application of a coupling of this kind to, in particular, automobile steering systems.

BRIEF DESCRIPTION OF THE DRAWING

Other characteristics of the invention will emerge on reading of the following description and claims and on examination of the accompanying drawing, which is given solely by way of example and in which:

Extensible telescopic couplings for rotationally connecting two shafts together, more particularly those intended for steering systems of automobile vehicles, being well known in the art, only what directly or indirectly concerns the invention will be described below. In other respects the one skilled in the art will refer to standard conventional solutions at their disposal for the purpose of dealing with any particular problems confronting them.

The same reference numeral will always be used hereinbelow to designate homologous components, whatever their particular form of construction may be.

DESCRIPTION OF PREFERRED EMBODIMENT

The following description relates more particularly to a coupling according to the invention which is specifically applied to a heavy truck steering column, but it is clear that this coupling is not restricted to this use. This particular application serves only to enable the construction and operation of the coupling to be better understood.

Figure 1:
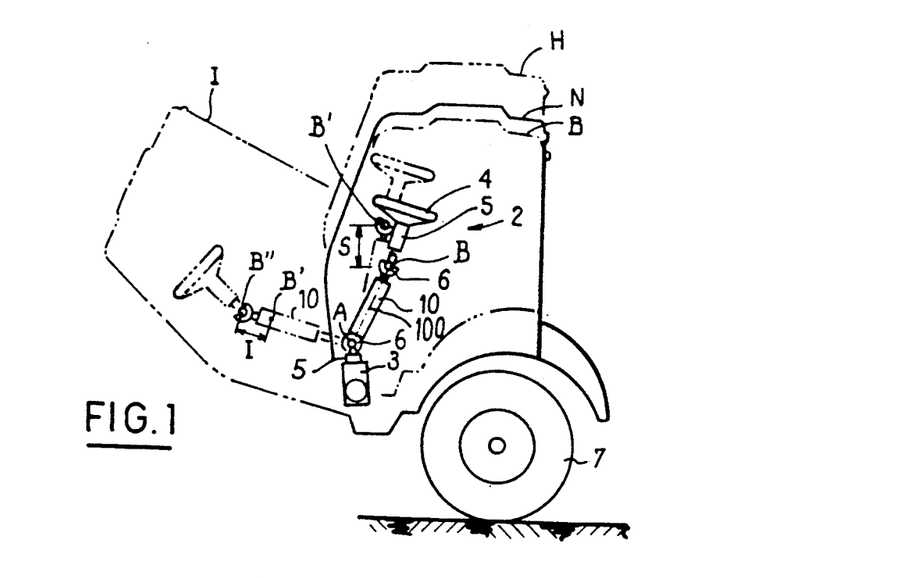
FIG. 1 is a schematic view of a suspended tilting cab of a heavy truck in which the steering column is equipped with a coupling according to the invention.

Reference will first be made to FIG. 1, in which it can be seen that a cab 1 of a heavy truck is equipped with a steering column 2 comprising in particular a steering box 3, a steering wheel 4, respective top and bottom shafts 5, and top and bottom articulations 6; these articulations are for example universal joints A and B respectively. Said steering column 2 operates a front wheel and axle set 7.

In this Figure, the cab in question is shown in solid lines N in the position which it normally occupies. Said cab is shown in heavy dot-dash lines H and B in the position which it occupies when its suspension system is in operation and it is at maximum or minimum deflection elongation respectively. Said cab is also shown in light dot-dash lines I in the position occupied by it when it has been tilted, for example for servicing the engine unit.

As can be seen, said steering column is equipped with a coupling 10 having the axis 100, according to the invention.

In the normal position of the cab, because of the hazards of the roadway, the steering wheel is subjected to practically vertical oscillations, which are random in respect of both frequency and amplitude. It will therefore be understood that the bottom articulation A will remain stationary, while the top articulation B can oscillate between positions B and B' because of the operation of its suspension system, which is of conventional type and is therefore not shown. The maximum path of such a deflection is for example designated by the reference S. This corresponds to the first, normal operating mode of the coupling according to the invention.

When the cab is tilted, it can be seen that the bottom articulation A always remains stationary, but that the top articulation B has moved from the position B' to another position designated B", which corresponds to an additional travel of the value I. This corresponds to the second, occasional operating mode of the coupling according to the invention.

When the cab is tilted, the sliding stresses for achieving maximum extension and the accuracy of angular transmission of rotation between the shafts of this coupling in the occasional operating mode are of no importance and are not critical, in contrast to what applies when the coupling is in its normal operating mode, in which safe driving is dependent on the ease of random axial deflection as well as on the accuracy of angular transmission of rotation, as will readily be understood.

For ease of description the structure of the component parts of a coupling according to the invention will be explained in succession before the operation of the latter is described.

As can be seen by reference to the various figures of the drawing, a coupling 10 according to the invention is capable of having a variable length, measured along its axis 100. Said coupling essentially comprises, among other parts, a female member 11, a male member 12, and an interposed member 13.

The female member 11 has a hollow part provided with an inside wall 111 having a non-circular cross-sectional profile 112. The free end of said hollow part terminates in an open edge 110; the other end is connected to a shaft, for example by means of a universal joint, as shown in the drawing.

The male member 12 has a hollow part which has, on the one hand, an external wall 121 having a non-circular cross-sectional profile 122. Said profile 122 is complementary to the profile 112 of the inside wall 111 of the female member 11. This hollow part of the male member 12 has in addition an inside wall 123 having a non-circular cross-sectional geometry 124.

The interposed member 13 has a first end, for example in the form of a tip having an external wall 131 which has a non-circular cross-sectional profile 132 which is complementary to the profile 112 of the inside wall 111 of the female member 11. Said interposed member 13 has another end, for example in the form of a tail having an external wall 133, which has a non-circular cross-sectional geometry 134 cooperable with the geometry 124 of the inside wall 123 of the male member 12.

As can be seen, the complementary profiles 112 and 122 of the female member 11 and male member 12 respectively are for example in the form of splines composed of a succession of internally formed grooves 1120 and teeth 1220 on the female member and externally formed grooves 1120' and teeth 1220' on the male member, which interengage in such a manner as to be relatively slidable along the axis 100 practically without stress and in such a manner as to be able to turn conjointly on the axis 100 practically without circumferential play. It will be observed in FIGS. 2b and 2c that exactly the same is true of the profile 112 of the female member 11 and the profile 132 of the interposed member 13, the profile 132 likewise being in the form of splines.

Figure 3:
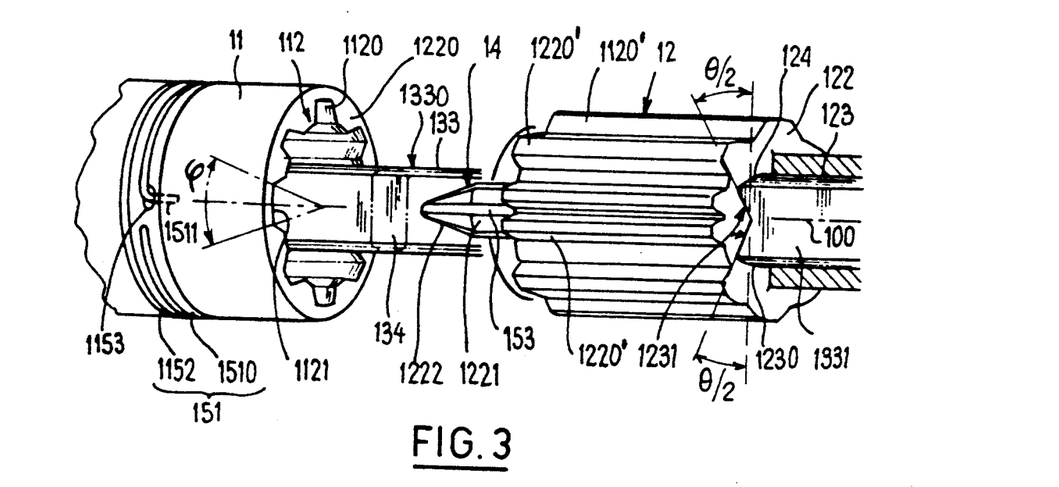
FIG. 3 is a partial schematic detail view in perspective of the embodiment illustrated in FIG. 2.

As can be seen in FIG. 3, the geometries 124 and 134, of the male member 12 and interposed member 13 respectively, which are cooperable with one another are composed for example of a bore 1230 in the male member 12 and a tail 1330 of the interposed member 13. The bore 1230 has at least one step composed of facets 1231 forming a dihedral, and the tail 1330 has at least one flat 1331. As can be understood, when said tail is engaged in the bore, they is displaced relative to one another, both by axial translation and by circumferential rotation with a given circumferential play having the angular value $\theta$.

This given angular circumferential play is the result of contact between one of the facets 1231 and the flat 1331. This arrangement is preferably diametrically symmetrical, as illustrated.

Figure 2A:
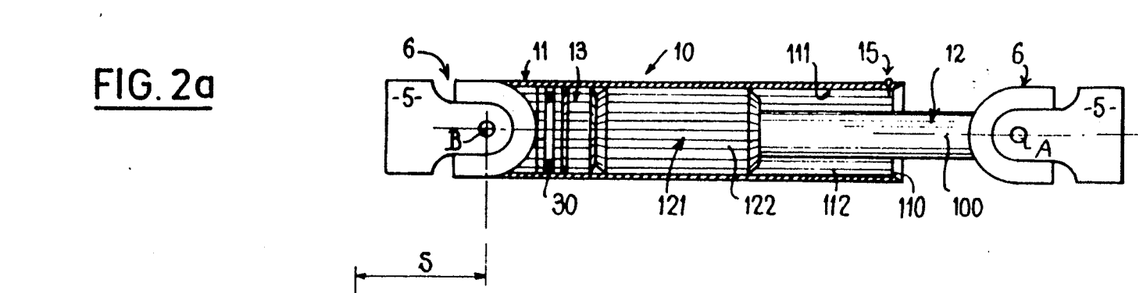
FIGS. 2a, 2b and 2c are views in schematic meridian section of a form of construction of a coupling according to the invention, showing respectively the positions occupied by it when it is completely compressed, when it is extended to its maximum deflection in its first operating mode, and when it is at maximum extension and completely extended in its second operating mode.
Figure 2B:
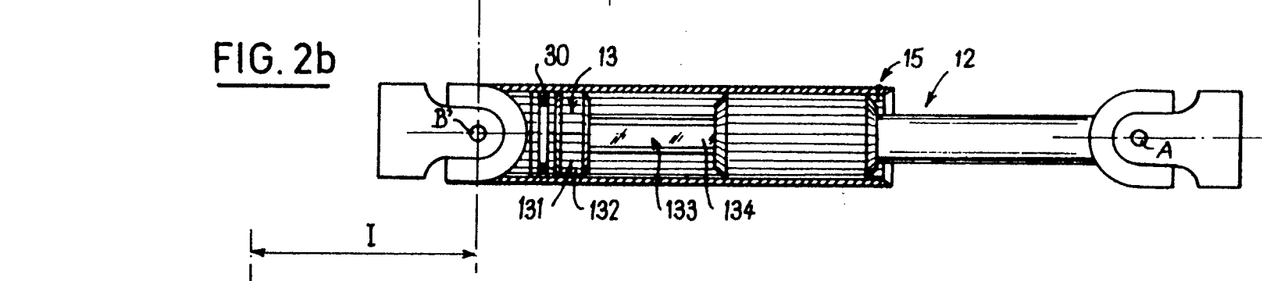
Figure 2C:
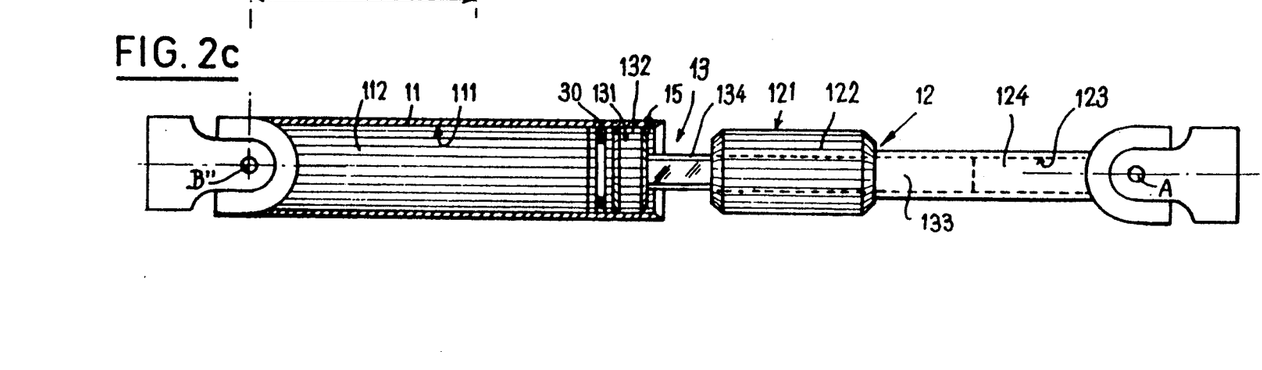
Figure 4A:
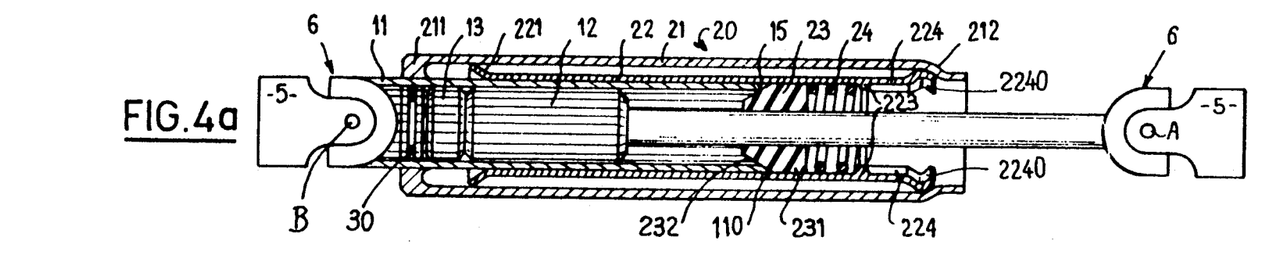
FIGS. 4a, 4b and 4c are views corresponding respectively to those shown in FIG. 2 and illustrating other details of the coupling according to the invention.
Figure 4B:
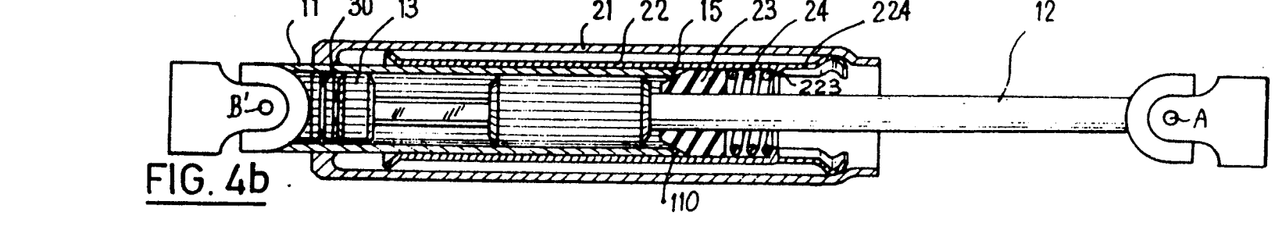

As can be seen in particular on examination of the various views shown in FIGS. 2 and 4, the male member 12 is engaged in the female member 11 in such a manner that the grooves and teeth of the splines formed by the complementary profiles 112 and 122 provided respectively on the inside wall 111 and external wall 121 can slide axially without circumferential play. This constitutes a connection of a main system which operates practically only during the first, normal operating mode. It can also be seen that the interposed member 13 is engaged both in the female member 11 and in the male member 12. This is done in such a manner that on the one hand the grooves and teeth of the splines of the complementary profiles 112 and 132 formed respectively on the inside wall 111 of the female member 11 and on the external wall 131 of the interposed member 13 slides axially without circumferential play, and that on the other hand the geometries 124 and 134 of the bore 1230 and of the tail 1330 of the male member 12 and interposed member 13 engaged one in the other are able to cooperate and, for the reasons previously explained, slides axially but, in this case, with a circumferential play $\theta$. This constitutes a joint of a secondary sliding system which operates practically only during the second, occasional operating mode.

In order to facilitate assembly, and in particular the engagement of the male member 12 in the female member 11, the coupling according to the invention is also preferably provided with an orientator 14.

Said orientator is, for example, composed of at least one beak 1221 provided with chamfers 1222; said beak extends one of the teeth 1220 formed on the male member 12, as can be seen particularly clearly on examination of FIG. 3. This orientator is also composed of at least one widened groove 1121, the angular value of whose arc $\gamma$ is at least equal to the value of the angle $\theta$. Use is preferably made of two widened, diametrically opposite notches for reasons of convenience of manufacture.

The coupling according to the invention is also preferably provided with a stop means 15 in order to prevent the female member 11 and the interposed member 13 from becoming desengaged from one another when the coupling is in its second operating mode, in which it is at its maximum extension.

Said stop means 15 consists mainly of a stop 151 carried by the female member 11. This can be seen more particularly from examination of the views shown in FIGS. 2 and 3. As can be seen here, the stop 151 comprises an elastic ring 1510 having a finger 1511. This stop also has a groove 1152 proved on the periphery of the female member 11. A radial hole 1153 pierced in said groove enables the finger 1511 to be engaged therein in such a manner that said finger projects into the interior of the female member 11 in order to enable the translation path of the interposed member 13 to be intercepted before the latter has passed completely out of the female member 11. Said finger comes into contact preferably with that part of the tip which is close to the tail of the interposed member, as can be seen on examination of FIG. 2C in particular. A groove 153 is provided in the male member 12, preferably being formed in the beak 1221, thus permitting relative axial displacement of the male member 12 and female member 11 when the coupling is operating in its second operating mode, as illustrated in particular in FIG. 3.

The coupling according to the invention is also preferably provided with a retractable seal 20 ensuring tightness between the female member 11 and the male member 12.

Said seal comprises a sheath 21, one end 211 of which is fixed outside the female member 11 and which is provided with a conical annular constriction 212. Said seal is also provided with a sleeve 22 situated at least in part between the female member 11 and the sheath 21. Said sleeve 22 is provided at one end with an external collar 221 and, near its other end, with at least one radial centripetal lug 223 and at least one axial elastic tongue 224 having a terminal ramp 2240. Use is preferably made of a series of lugs and a series of tongues regularly distributed and interposed alternately over a circumference, as illustrated. Said seal also comprises a circular packing 23 disposed, at least in part, between the male member 12 and the sleeve 22. Said packing 23 has a relatively flat support surface 231 and a conical flank 232, as can be seen in particular in the various views shown in FIG. 4. In addition, said seal also comprises a spring 24 disposed between the male member 12 and the sleeve 22 in such a manner as to rest on the one hand against the relatively flat support surface 231 and on the other hand against the lug 223. As can be seen from the various views shown in FIG. 4, these components of the retractable seal 20 are mounted and assembled in such a manner that the sleeve 22 slides axially between the female member 11 and the sheath 21, between a retracted position which corresponds to the first, normal operating mode and an extended position which corresponds to the second, occasional operating mode of the coupling according to the invention. As can be seen, the constriction 212 cooperates with the ramps 2240 of the tongues 224 to permit passage from one to the other of these two respective extended and retracted positions. It will also be observed that the packing 23 is axially slidable on the male member 12, and that the spring 24 urges said packing away from the lugs 223 in order to achieve contact between the edge 110 of the female member 11 and the flank 232 of the packing 23.

It will be noted that the deflections are limited mechanically whatever the operating mode. In addition, functional clearance between the constriction 212 and the collar 221 makes it possible to absorb dimensional fluctuations.

The coupling according to the invention also preferably includes a safety means 30 for ensuring the continuity of transmission of a rotation or torque between the female member 11 and the male member 12 in the event of failure of the connection provided by the complementary profiles 112 and 122 of the female member 11 and male member 12 respectively.

Further reference to said safety means will be made hereinbelow. For the moment it should be noted that this safety means 30 comprises a brake 31 interposed between the female member 11 and the interposed member 13 in order normally to hold and lock axially the latter in said female member when the coupling according to the invention is in its normal operating mode.

The brake 31 has a shoe 311, for example of toric shape, placed between two preferably splined disks 312 which are fixed on the tail 1330 of the interposed member 13, such as by welding in such a manner that the shoe 311 bears against the inside wall 111 of the female member 11. This can be seen in particular on examination of FIG. 5.

It can therefore be seen that with the aid of the coupling according to the invention, when the cab is in its normal position suitable for driving, whatever the vertical position of the cab oscillating because of the operation of its suspension system, torque is transmitted from the steering wheel to the steering box without hindrance because of the easy axial sliding and without loss of accuracy in the transmission of the rotation or torque through the splines which make a connection without circumferential play. When the cab is temporarily tilted for servicing purposes, it can be seen that a rotation or torque is still transmitted to the wheels of the front wheel and axle set of the vehicle, but in this case through a joint which permits circumferential play; in this situation the accuracy of transmission of the rotation is of no importance, which is also true of axial sliding.

From the above it can therefore be seen that the coupling according to the invention comprises on the one hand a main sliding system consisting essentially of the female member 11 and the male member 12, forming a connection permitting easy axial sliding and transmission of rotation practically without play, and on the other hand a secondary sliding system composed of the male member 12, the interposed member 13 and the female member 11, forming a joint which permits axial sliding with a stress which may be greater and transmission of rotation with radial play.

As will be understood from the further description given below, the presence of the safety means has the consequence that the secondary sliding system can nevertheless transmit a rotation or torque, but does so with sufficiently considerable play which, in principle, warns the driver of an anomaly, and more particularly of wear in the steering column, when the coupling according to the invention is in its first operating mode.

The manner in which wear occurs in a coupling according to the invention can be seen in particular on examination of the various cross sections shown in FIG. 6.

Figure 5:
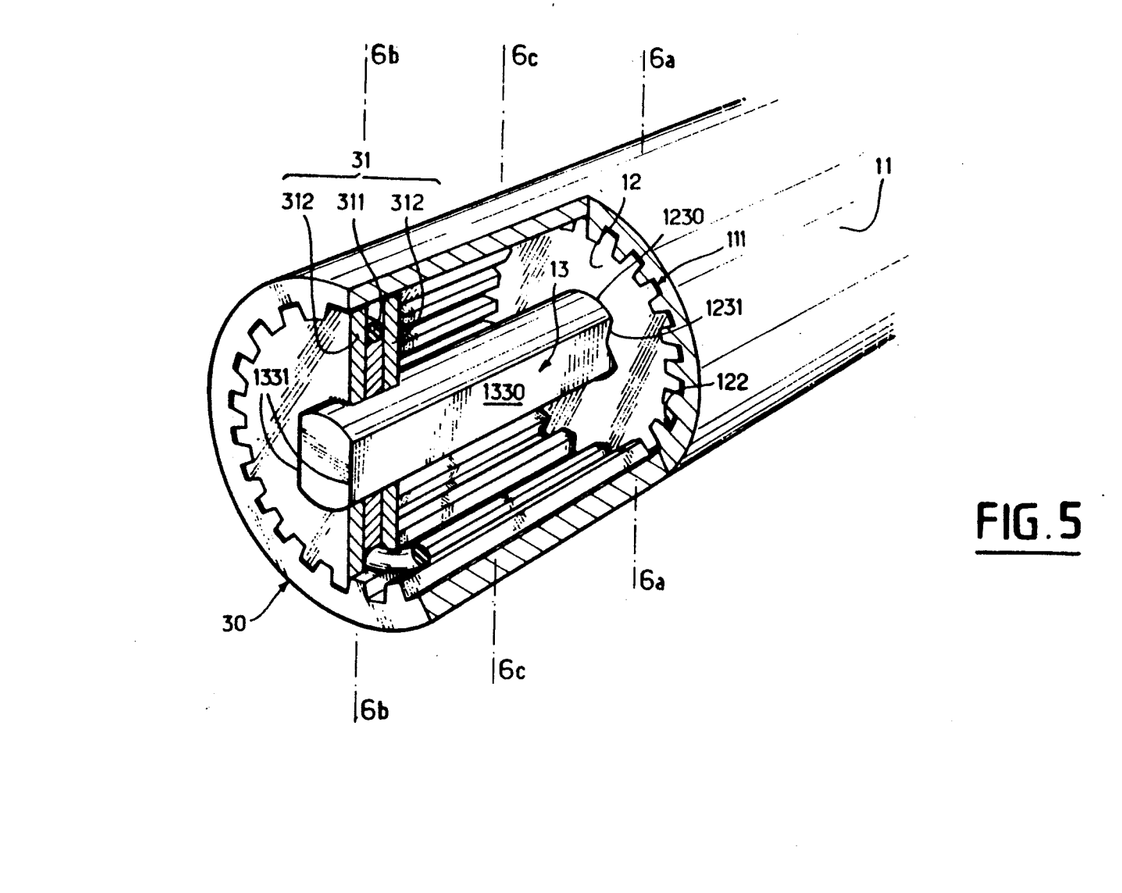
FIG. 5 is a detail view in perspective of another feature of a coupling according to the invention.
Figure 6A:
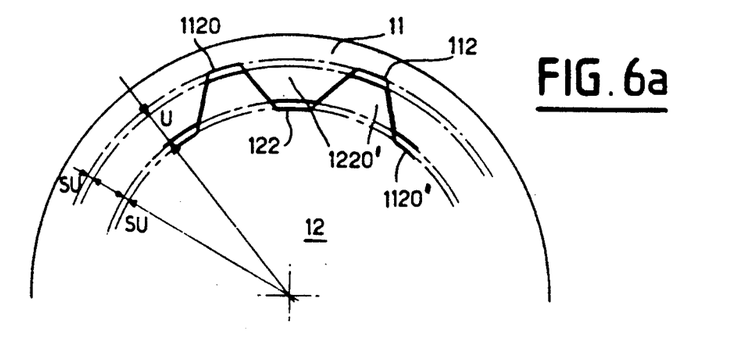
FIGS. 6a, 6b and 6c are cross-sectional views illustrating the behavior of a coupling according to the invention in different states of wear.

The view in FIG. 6a is a cross-section taken on the line 6a in FIG. 5. It illustrates the condition of a new coupling in which the wear zones are indicated by the letter U and the zones free from wear are indicated by the letters SU.

Figure 6B:
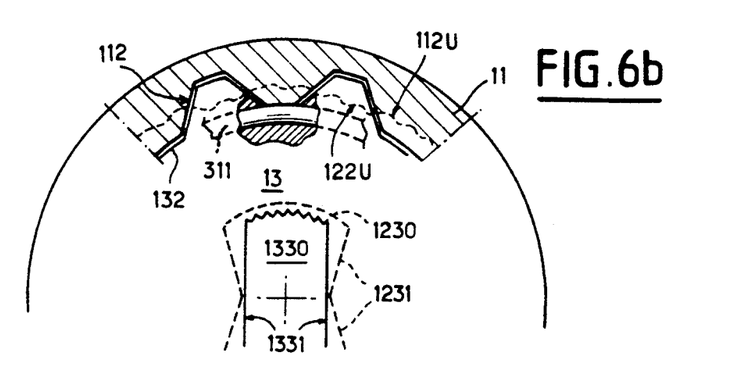

The view in FIG. 6b is a cross-section taken on the line 6b in FIG. 5. The reference numerals accompanied by the letter U designate profiles on which wear has occurred.

Figure 6C:
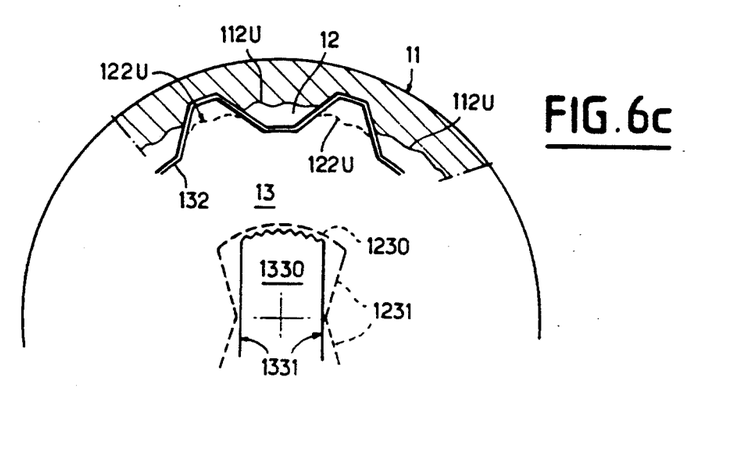

The view in FIG. 6c is a cross-section taken on the line 6c in FIG. 5 and similar to that shown in FIG. 6b, but with the assumption that the safety device 30 is disposed therein.

As has previously been recalled, the extensible coupling according to the invention operates in accordance with two operating modes provided by virtue of the existence of a main sliding system, which has to ensure safety and accuracy in the steering of the vehicle, and a secondary sliding system which has to permit the opening of the cab and possibly the changing of the direction of the wheels of the front wheel and axle set. During the operating life of the coupling according to the invention it can be stated as an approximation that the main sliding system will operate to the extent of 95%, while the secondary sliding system will operate only during the remainder of this time, that is to say 5%. In these circumstances the main sliding system is sometimes subjected abnormally to heavy stresses and friction, which give rise to considerable wear and consequently to the occurrence of increasingly substantial play and finally of inability to transmit a rotation. On the other hand, the secondary sliding system is much more lightly stressed because of the existence of considerable initial circumferential play. As already indicated, friction and wear due to the latter are therefore much lighter. It is for that reason, in order to take advantage of this fact, that the coupling according to the invention is provided with a safety device 30 containing a brake 31 in order to produce axial friction between the female member 11 and the interposed member 13. Because of the existence of this safety device, it will be understood that the secondary sliding system remains axially locked in the top position relative to the female member 11 when the cab is at its minimum elongation (B') as a result of its deflections permitted by the suspension system. As a result of this, the secondary sliding system is not subjected to wear through rotational friction when the cab is in its normal driving position, that is to say when the coupling according to the invention is operating in accordance with its normal operating mode. Because of the safety device provided in the coupling according to the invention, it can be seen that in the worst situation, that is to say when the main sliding system is deteriorated, the safety of the steering column is ensured by the secondary sliding system, which permits transmission of rotation with play while warning the driver of the vehicle of the deterioration of the steering system through the occurrence of this considerable circumferential play, which is for example of the order of 15°, which he will feel through the steering wheel.

As will be understood, the safety device of the coupling according to the invention operates for both operating modes. For the first operating mode, use is made of the non-circular profile 112 of the inside wall 111 of the female member 11, more particularly the top part of the latter which is practically never stressed and with which the complementary profile 132 of the interposed member 13—which is not worn and which is not subject to wear for the reasons just indicated—is in engagement and effects the transmission of torque. For the second operating mode, in the possible case where the interposed member 13 does not remain in contact with the unworn profile U (FIG. 6a) of the female member 11, use is made of the bottom of the remaining splines SU (FIG. 6a) of the profile 112 of the inside wall 111 of the female member 11, with which the unworn complementary splines of the interposed member 13 are in contact, in order to effect the transmission of the rotation or torque. It will be noted that the outside diameter of the splines in the new condition of the male member 12 is smaller than the outside diameter of the complementary splines.

As has been indicated, the coupling according to the invention is also provided with an orientator 14. The latter is necessary in order to facilitate the assembly of the female member 11 and the male member 12, since these two members have a circumferential play $\theta$ of the order of 15°. In order to permit the engagement of the male member 12, carried by the interposed member 13, in the female member 11, because of the existence of this play two larger, diametrically opposite widened grooves 1121 are provided, as previously indicated, in which at least one chamfered beak 1221 is engaged. This also permits the engagement and the operation of the stop means 15, which has previously been mentioned, because of the presence of the groove 153.

Figure 4C:
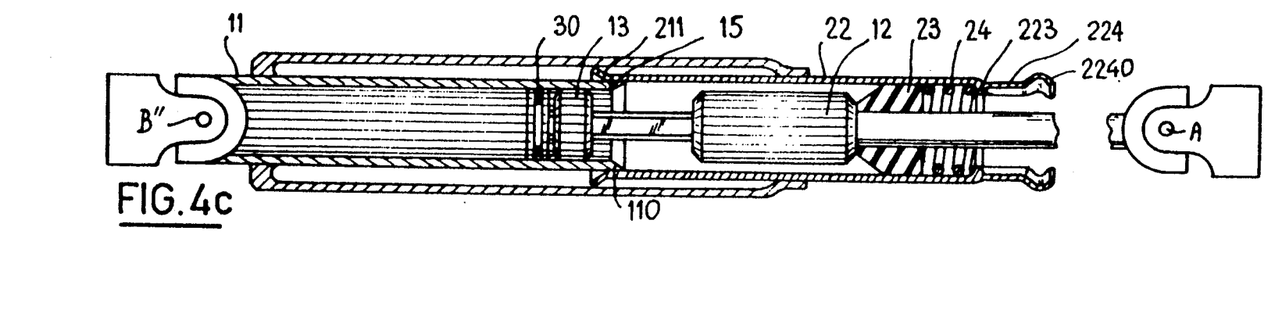

In order to enable the coupling according to the invention to operate normally, it is necessary to ensure tightness between its different components, so that foreign bodies cannot disturb its operation. As has been indicated, the seal provided comprises snap parts and a spring which contributes towards ensuring rightness by holding in contact the conical flank 232 of the packing 23 and the edge 110 of the female member 11. The tilting of the cab in one direction or the other brings about the opening or the closing of the coupling. Reference to the various views in FIG. 4 rt is to be seen that the sheath 21 is fastened to the female member 11 and can axially retain the sleeve 22 mounted between the sheath and the female member. The spring 24 makes it possible to achieve permanent contact between the packing 23 and the edge 110 of the female member 11 when the cab is in its normal driving position and the coupling according to the invention is operating in accordance with its first operating mode. When the cab is tilted in order to put the coupling according to the invention into its second operating mode, the sheath 21 constricts the tongues 224 of the sleeve 22, the constriction 212 pressing against the ramps 2240, and then slides on said sleeve until opening is complete. The sleeve 22 is in turn slightly displaced downwards until the spring 24 is completely relaxed, or because of the vertical position, at the commencement of the cab opening phase. The sleeve 22 can, however, be displaced on the sheath 21 without impairing the rightness of the coupling, and conversely. In practice, however, the sleeve 22 tends to remain in the position in which it is shown in FIG. 4c because of the friction existing between the packing 23, the sleeve 22 and the male member 12.

All the interest and all the advantages of the coupling according to the invention will thus be understood, said coupling in particular permitting practically the doubling of the elongation possible between the most retracted position and the most extended position, relative to that possible with known solutions, and also making it possible to give warning of a state of wear which could impair safety because of deterioration of the accuracy of transmission of a rotation.

What is claimed is:

1. An extensible coupling comprising:
a female member having a hollow part, an inside wall of the female member having a non-circular cross-sectional profile;
a male member having a hollow part, an external wall of the male member having a non-circular cross-sectional profile complementary to and engageable with the profile of the inside wall of the female member such that the male member is axially slidable relative to the female member without circumferential play, and an inside wall of the male member having a non-circular cross-sectional geometry;
an interposed member, a first end of the interposed member having an external wall having a non-circular cross-sectional profile complementary to and engageable with the profile of the inside wall of the female member such that the interposed member is axially slidable relative to the female member without circumferential play, and a second end of the interposed member having an external wall having a non-circular cross-sectional geometry cooperable with the geometry of the inside wall of the male member such that the interposed member is axially slidable relative tot he male member with circumferential play;
safety means for ensuring continuity of transmission of rotation between the female member and the male member in the event of failure of engagement between the female member and the male member, the safety means including a brake disposed between the female member and the interposed member,
wherein a main sliding system is operable in a first, normal operating mode in which the male member engages the female member such that the male member and the female member slide axially relative to one another without circumferential play, the brake hindering relative axial movement between the interposed member and the female member from a position corresponding to the first operating mode of the coupling; and
wherein a secondary sliding system is operable in a second, occasional operating mode in which the first end of the interposed member engages with the female member and the second end of the interposed member cooperates with the male member such that the first end of the interposed member and the female member are axially slidable relative to one another without circumferential play, and the second end of the interposed member and the male member are axially slidable relative to one another with circumferential play 2. The coupling as set forth in claim 1, wherein the complementary profiles of the inside wall of the female member and the external wall of the male member and the external wall of the first end of the interposed member are splines formed by a succession of grooves and teeth.

3. The coupling as set forth in claim 1, further comprising a stop for preventing the female member and the interposed member from disengaging from one another, at least a portion of said stop extending radially inward from the inside wall of the female member such that said stop prevents axial movement of the interposed member in the female member past said stop.

4. The coupling as set forth in claim 1, wherein the brake includes a shoe and at least one disk fixed on the interposed member relative to the shoe such that the shoe bears against the inside wall of the female member.

5. An extensible coupling, comprising:
a female member formed with a non-circular bore;
a male member, the male member being formed with a non-circular exterior portion and a non-circular bore, the male member being engageable and disengageable with the female member, the non-circular exterior portion of the male member being axially slidable and non-rotatable in the non-circular bore of the female member when the male member and the female member are engaged;
an interposed member, the interposed member having a first end formed with a non-circular exterior and a second end formed with a non-circular exterior, the first end of the interposed member being engageable with the female member, the second end of the interposed member being cooperable with the male member, the first end of the interposed member being non-rotatable in the non-circular bore of the female member when the first end of the interposed member and the female member are engaged, the second end of the interposed member being rotatable, through a limited angle, and axially slidable in the non-circular bore of the male member when the second end of the interposed member and the male member cooperate;

a main sliding system, for use in a first operating mode, formed by engagement of the female member with the male member and the first end of the interposed member such that the female member and the male member area axially slidable relative to one another, the male member and the interposed member are axially slidable relative to one another, and the male member and the interposed member are non-rotatable relative to the female member; and a secondary sliding system, for use in a second operating mode, formed by engagement of the female member with the first end of the interposed member such that the interposed member is non-rotatable relative to the female member, and by cooperation of the male member with the second end of the interposed member such that the male member and the interposed member are rotatable, through the limited angle, and axially slidable relative to one another.

6. The coupling set forth in claim 5, wherein the non-circular bore of the female member and the non-circular exterior portion of the male member and the first end of the interposed member include splines forming a plurality of radial grooves and teeth.

7. The coupling set forth in claim 6, further comprising means for orienting the female member and the male member relative to one another, the orienting means including a chamfered beak extending from a tooth on the male member, and a widened groove formed in the female member in which the beak is insertable and slidable, the widened groove extending through an arc of the female member that is wider than the tooth from which the beak extends by an amount at least equal to an arc on the female member through the limited angle.

8. The coupling set forth in claim 7, further comprising stop means for preventing the female member and the interposed member from disengaging, the stop means including an elastic ring and a finger connected to and extending radially toward the inside of the elastic ring, the female member being formed with a radial hole extending from a peripheral surface of the female member to the widened groove, the hole receiving the finger, the beak and the tooth from which the beak extends being formed with an axial groove for permitting disengagement of the male member and the female member.

9. The coupling set forth in claim 5, wherein the non-circular bore of the male member is formed with at least one side wall having two facets forming a dihedral, and the non-circular exterior of the second end of the interposed member is formed with at least one flat side adapted to contact one of the two facets when the male member and the interposed member cooperate.

10. The coupling set forth in claim 5, further comprising stop means for preventing the female member and the interposed member from disengaging.

11. The coupling set forth in claim 5, further comprising means for tightening the female member and the male member, the tightening means including:

a radial sheath, one end of the sheath being fixed to an exterior of the female member, the sheath being formed, at the other end, with a conical annular constriction, a sleeve, at least a portion of the sleeve being disposed between the sheath and the female member, the sleeve having, at one end, an external collar extending radially outward and frictionally engaging the sheath and the female member and, at another end, at least one centripetal lug extending radially inward and at least one axial elastic tongue, the axial elastic tongue having a terminal ramp, a packing member, annularly disposed around a second portion of the male member such that it is between the second portion of the male member and an interior portion of the sleeve, the packing member being formed with a support surface and a flank, the packing member being axially slidable on the second portion of the male member, a spring, annularly disposed between the second portion of the male member and the interior portion of the sleeve, the spring having two ends, one end of the spring being disposed adjacent the support surface and the other end of the spring being disposed adjacent the lug, the spring urging the flank against the female member in the first operating mode, wherein the ramp abuts the constriction in the first operating mode and is thereby held in a retracted position by the constriction, wherein the tongue is bendable such that the ramp is moved out of abutment with the constriction and such that the ramp and the tongue are radially narrower than the constriction, thereby permitting the sleeve to slide axially between the female member and the sheath from the retracted position and an extended position in the second operating mode, wherein the packing slides axially relative to the second portion of the male member, and wherein the spring urges the packing member away from the lug such that the flank abuts against an edge of the female member in the first operating mode to retain the male member in the female member.

12. The coupling as set forth in claim 5, further comprising safety means for transmitting torque between the female member and the male member in the event of failure of the engagement between the male member and the female member, the safety means including a brake connected at the first end of the interposed member for hindering axial movement of the interposed member relative to the female member by frictionally bearing against the female member.

13. The coupling as set forth in claim 12, wherein the brake includes a radial shoe for frictionally bearing against the female member and a disk, fixed to the interposed member, for holding the radial shoe in position relative to the interposed member.

14. An extensible coupling, comprising:

a female member having a hollow part, an inside wall of the female member having a non-circular cross-sectional profile;

a male member having a hollow part, an external wall of the male member having a non-circular cross-sectional profile complementary to and engageable with the profile of the inside wall of the female member such that the male member is axially slidable relative to the female member without circumferential play, and an inside wall of the male member having a non-circular cross-sectional geometry;

an interposed member, a first end of the interposed member having an external wall having a non-circular cross-sectional profile complementary to and engageable with the profile of the inside wall of the female member such that the interposed member is axially slidable relative to the female member without circumferential play, and a second end of the interposed member having an external wall having a non-circular cross-sectional geometry cooperable with the geometry of the inside wall of the male member such that the interposed member is axially slidable relative to the male member with circumferential play;

wherein a main sliding system is operable in a first, normal operating mode in which the male member engages the female member such that the male member and the female member slide axially relative o one another without circumferential play;

wherein a secondary sliding system is operable in a second, occasional operating mode in which the first end of the interposed member engages with the female member and the second end of the interposed member cooperates with the male member such that the first end of the interposed member and the female member are axially slidable relative to one another without circumferential play, and the second end of the interposed member and the male member are axially slidable relative to one another with circumferential play; and wherein the cooperating geometries of the inside wall of the male member and the external wall of the second end of the interposed member include a bore formed in the male member, the bore forming at least a portion of the inside wall of the male member, the bore being formed with at least one step having facets forming a dihedral, and a tail forming a portion of the external wall of the second end of the interposed member, the tail being formed with at least one flat in such a manner as to allow a given circumferential play ($\theta$) by contact between one or the other, the facets and the flat contacting one another such that the interposed member is circumferentially movable.

15. An extensible coupling, comprising:

a female member having a hollow part, an inside wall of the female member having a non-circular cross-sectional profile;

a male member having a hollow part, an external wall of the male member having a non-circular cross-sectional profile complementary to and engageable with the profile of the inside wall of the female member such that the male member is axially slidable relative to the female member without circumferential play, and an inside wall of the male member having a non-circular cross-sectional geometry;

an interposed member, a first end of the interposed member having an external wall having a non-circular cross-sectional profile complementary to and engageable with the profile of the inside wall of the female member such that the interposed member is axially slidable relative to the female member without circumferential play, and a second end of the interposed member having an external wall having a non-circular cross-sectional geometry cooperable with the geometry of the inside wall of the male member such that the interposed member is axially slidable relative o the male member with circumferential play;

the complementary profiles of the inside wall of the female member and the external wall of the male member and the external wall of the first end of the interposed member are splines formed by a succession of grooves and teeth;

an orientator for facilitating the engagement of the male member with the female member the orientator including a beak formed with a chamfer extending from a tooth on the male member and at least one widened groove formed in the female member;

wherein a main sliding system is operable in a first, normal operating mode in which the male member engages the female member such that the male member and the female member slide axially relative to one another without circumferential play;

wherein a secondary sliding system is operable in a second, occasional operating mode in which the first end of the interposed member engages the female member and the second end of the interposed member cooperates with the male member such that the first end of the interposed member and the female member are axially slidable relative to one another without circumferential play, and the second end of the interposed member and the male member are axially slidable relative to one another with circumferential play; and wherein the widened groove is formed such that it is at least as wide as the tooth from which the beak extends plus an arc length, taken at the inside wall of the female member, of an angle through which the interposed member and the male member cooperate with circumferential play.

16. An extensible coupling, comprising: axial movement of the interposed member in the female member past said stop;

wherein said stop includes an elastic ring having a finger, a peripheral groove is formed in the female member and said groove is pierced by a radial hole, said groove and said hole receiving said ring and said finger respectively;

wherein a main sliding system is operable in a first, normal operating mode in which the male member engages the female member such that the male member and the female member slide axially relative to one another without circumferential play; and wherein a secondary sliding system is operable in a second, occasional operating mode in which the first end of the interposed member engages with the female member and the second end of the interposed member cooperates with the male member such that the first end of the interposed member and the female member are axially slidable relative to one another without circumferential play, and the second end of the interposed member and the male member are axially slidable relative to one another with circumferential play.

17. An extensible coupling, comprising:

a female member having a hollow part, an inside wall of the female member having a non-circular cross-sectional profile;

a male member having a hollow part, an external wall of the male member having a non-circular cross-sectional profile complementary to and engageable with the profile of the inside wall of the female member such that the male member is axially slidable relative to the female member without circumferential play, and an inside wall of the male member having a non-circular cross-sectional geometry;

an interposed member, a first end of the interposed member having an external wall having a non-circular cross-sectional profile complementary to and engageable with the profile of the inside wall of the female member such that the interposed member is axially slidable relative to the female member without circumferential play, and a second end of the interposed member having an external wall having a non-circular cross-sectional geometry cooperable with the geometry of the inside wall of the male member such that the interposed member is axially slidable relative to the male member with circumferential play;

a retractable seal for ensuring tightness between the female member and the male member, the seal including:

a sheath having a first end fixed to the outside of the female member and a conical annular constriction at a second end, a sleeve disposed at least in part between the female member and the sheath and having at one end an external collar frictionally engaging an exterior portion of the female member and an interior portion of the sheath and, near its other end, at least one radial centripetal lug and at least one axial elastic tongue having a terminal ramp, a hollow packing annularly disposed, at least in part, around a second portion of the male member such that it is between the second portion of the male member and an interior portion of the sleeve, the packing being formed with a support surface and a flank, and a spring annularly disposed between the male member and the sleeve such that one end of the spring abuts against the support surface and another end of the spring abuts against the lug;

wherein a main sliding system is operable in a first, normal operating mode in which the male member engages the female member such that the male member and the female member slide axially relative to one another without circumferential play;

wherein a secondary sliding system is operable in a second, occasional operating mode in which the first end of the interposed member engages with the female member and the second end of the interposed member cooperates with the male member such that the first end of the interposed member and the female member are axially slidable relative to one another without circumferential play, and the second end of the interposed member and the male member are axially slidable relative to one another with circumferential play; and wherein said seal is mounted such that the sleeve slides axially between the female member and the sheath from a retracted position, when the coupling is in its first, normal operating mode, to an extended position when the coupling is in its second, occasional operating mode, the constriction abutting the ramp of the tongue to hold the sleeve in the retracted position, and the tongue being bendable to move the ramp out of abutment with the constriction to permit passage from one to the other of the retracted and extended positions, and such that the packing slides axially on the male member, the spring urging it away from the lug in order to apply it against an edge of the female member.

18. An automobile steering system with an extensible coupling, comprising:

a first shaft;

a steering wheel connected to one end of the first shaft;

a second shaft;

a steering box connected to one end of the second shaft;

a female member formed with a non-circular bore;

means for connecting the female member to a second end of the first shaft;

a male member, the male member being formed with a non-circular exterior portion and a non-circular bore, the male member being engageable and disengageable with the female member, the non-circular exterior portion of the male member being axially slidable and non-rotatable in the non-circular bore of the female member when the male member and the female member are engaged;

means for connecting the male member to a second end of the second shaft;

an interposed member, the interposed member having a first end formed with a non-circular exterior and a second end formed with a non-circular exterior, the first end of the interposed member being engageable with the female member, the second end of the interposed member being cooperable with the male member, the first end of the interposed member being non-rotatable in the non-circular bore of the female member when the first end of the interposed member and the female member are engaged, the second end of the interposed member being rotatable, through a limited angle, and axially slidable in the non-circular bore of the male member when the second end of the interposed member and the male member cooperate;

a main sliding system, for use in a first operating mode, formed by engagement of the female member with the male member and the first end of the interposed member such that the female member and the male member are axially slidable relative to one another, the male member and the interposed member are axially slidable relative to one another, and the male member and the interposed member are non-rotatable relative to the female member; and a secondary sliding system, for use in a second operating mode, formed by engagement of the female member with the first end of the interposed member such that the interposed member is non-rotatable relative to the female member, and by cooperation of the male member with the second end of the interposed member such that the male member and the interposed member are rotatable, through the limited angle, and axially slidable relative to one another.

* * * * *